(12) United States Patent
Horsch

(10) Patent No.: US 9,894,830 B2
(45) Date of Patent: Feb. 20, 2018

(54) DISTRIBUTION DEVICE FOR GRANULAR MATERIAL

(71) Applicant: Horsch Maschinen GmbH, Schwandorf (DE)

(72) Inventor: Philipp Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 19 days.

(21) Appl. No.: 14/865,243

(22) Filed: Sep. 25, 2015

(65) Prior Publication Data

US 2016/0088791 A1 Mar. 31, 2016

(30) Foreign Application Priority Data

Sep. 26, 2014 (DE) .................. 10 2014 114 028

(51) Int. Cl.
| | |
|---|---|
| *A01C 7/08* | (2006.01) |
| *A01C 7/10* | (2006.01) |
| *A01C 19/02* | (2006.01) |
| *A01C 7/16* | (2006.01) |
| *A01C 5/06* | (2006.01) |
| *A01C 7/04* | (2006.01) |

(52) U.S. Cl.
CPC ................ *A01C 7/16* (2013.01); *A01C 5/062* (2013.01); *A01C 7/102* (2013.01); *A01C 7/105* (2013.01); *A01C 19/02* (2013.01); *A01C 7/04* (2013.01); *A01C 7/081* (2013.01)

(58) Field of Classification Search
CPC combination set(s) only.
See application file for complete search history.

(56) References Cited

U.S. PATENT DOCUMENTS

2012/0227647 A1 9/2012 Gelinske et al.

FOREIGN PATENT DOCUMENTS

| DE | 102013215183 B3 | 9/2014 |
|---|---|---|
| EP | 0255630 A1 | 2/1988 |
| EP | 0350634 A2 | 1/1990 |
| EP | 0702890 A2 | 3/1996 |
| EP | 1889532 A2 | 2/2008 |

*Primary Examiner* — Alicia Torres
(74) *Attorney, Agent, or Firm* — Erickson Kernell IP, LLC

(57) ABSTRACT

A distribution device for metering granular material, such as seeds, fertilizer, or the like. The seed drill coulters of this distribution device are supplied with grains from at least one grain storage hopper via respectively separate feed tubes, wherein each of these feed tubes is allocated a metering device and a sensor unit for detecting the grains located in the partial flow. Each sensor unit and each metering device are respectively connected in signaling terms with a central regulating device, which processes the quantities of grains detected in the feed tubes as well as the motor torques measured in the metering devices, and which regulates the grain distances for each metering device by varying the drive speeds of the drives under consideration of target values for the grain distances and/or of target values of a longitudinal distribution of the grains from single, multiple, or all metering devices.

13 Claims, 3 Drawing Sheets

DISTRIBUTION DEVICE FOR GRANULAR MATERIAL

CROSS-REFERENCE TO RELATED APPLICATIONS

This application claims priority from German Application No. DE 10 2014 114 028.1 filed Sep. 26, 2014, the contents of which are incorporated herein by this reference.

BACKGROUND OF THE INVENTION

The present invention relates to a distribution device for metering granular material, such as seeds, fertilizer, or the like with the features of the independent claim 1.

Various approaches are known from the prior art for improving seed drilling to the effect that sowing is carried out more evenly. The most important objective pursued in this context lies in not letting the grain spacing vary too much within a row in order to thus at least roughly approximate a single grain sowing.

DE 10 2013 215 183 B3 discloses a method and a device for metering granular material such as seeds, fertilizer, etc. In this instance, the granular material being carried and conveyed by an airflow is guided through a feed tube into a metering unit, where a conveyor disk or fan disk, which is driven by an electric motor, rotates concentrically. The drive speed of the disk can be increased or reduced on the basis of a measured torque of the electromotive drive.

However, with the speed variation of the metering unit possibly being too sluggish under stronger fluctuations in the grain transport and the resulting possibility of blockages occurring in the metering unit, it is desirable to take further parameters into account for the regulation. For this reason, the objective of the present invention lies in improving the regulation quality and thus the evenness of the grain metering in such a device as is known from DE 10 2013 215 183 B3.

SUMMARY OF THE INVENTION

This object is achieved by arranging at least one grain flow sensor upstream of each metering unit, which grain flow sensor can be located, for example, in a feed tube or, for example, in a distribution unit, such as a distribution tower, for example. The data from the grain flow sensor, which can typically be formed by an impact sensor, in particular by a piezoelectrically operating impact sensor, are used, in terms of regulating, for varying the rotational speed of the electric drive motor of the metering unit such that the conveyor disk or fan disk rotates slower or faster in order to be able to react better to strong fluctuations in the grain flow and in order to prevent undesirable jam-ups or blockages due to a too high quantity of grains.

The present drive torque of the electric drive motor is determined by or derived from measuring its electric current consumption because this allows drawing an immediate conclusion relating to the motor resistances and thus to the motor torque to be applied. The object of an improved evenness of the seeds being sowed can be achieved by an adjustment of the motor speed on the basis of the measured drive torque, whereby stronger fluctuations in the sowing rate of an individual metering unit can be compensated for or suppressed in a desired manner. Although the sowing rates can still vary between the individual rows in this manner, the object of optimized and preferably non-fluctuating grain spacing within the row is achieved.

The supply for the metering units is carried out via the already present air supply of a pneumatic sowing machine, which typically has a central distributor head with flexible seed tubes leading to the individual seed drill coulters. By means of this pneumatic system, all coulters and metering units are supplied with seeds as evenly as possible. The individual metering units are placed within these flexible seed tubes, typically close to the seed drill coulters, as the downpipes to the seed drill coulters normally are the outlet tubes of the metering units.

In addition, grain sensors for monitoring the grain quantities released by the metering unit are arranged in the downpipes such that these sensor values can be used for the further regulation of the drive motors.

The described metering device is particularly suitable for placement in grain-conducting tubes, in particular in seed tubes of a per se known sowing machine, in particular of such a one that conveys pneumatically. Such a metering device can be arranged in each seed tube, where it can provide for ensuring a distribution approximating single seed distribution. The metering device therefore is an accessory that is suitable for supplementing an existing sowing machine and thus turning it into a singulating grain sowing machine.

The airflow carries and conveys the granular material during its entire transport from the grain supply to the seed drill coulter, with the airflow being guided along an approximately circular arc path within the metering unit and being tangentially conducted into an outlet tube, which is adjacent to the metering unit and which runs slightly curved, at least in sections. In this context it can be provided that the circular arcs of the outlet tube and the inner cover surface of the metering unit tangentially touch and that the air guiding path and the grain guiding path steplessly/seamlessly merge into each other. Also, a radius of curvature of the outlet tube is approximately constant, at least in a section adjoining the metering unit. It can optionally be provided that the radius of curvature of the outlet tube opens continuously or discontinuously with increasing distance from the metering unit.

In a sowing machine with a multitude of such distribution devices, which are each equipped with a metering unit and a grain flow sensor arranged upstream of it, all relevant data are processed in an electronic regulating unit, including a present running speed, the drive speeds of the rotating conveyor disks or fan disks, and also the grain flow data of the grain flow sensors in the feed lines to the metering units. All processed data can preferably be stored, analyzed and used, for instance, for a display unit or for statistical analyses with regard to a grain distribution quality or the like.

The regulation of the metering units can essentially be based on a preselected average rotational speed for the electric drive motor of the rotating conveyor disk or fan disk, which rotational speed is corrected or adjusted in dependence on the measured values from the grain flow sensor arranged upstream. Based on the course of measurements, an approximation to an ideal value for the drive speed can be carried out in order to better take into account the grain quantities, which fluctuate or change over longer time intervals.

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

Figure 1:
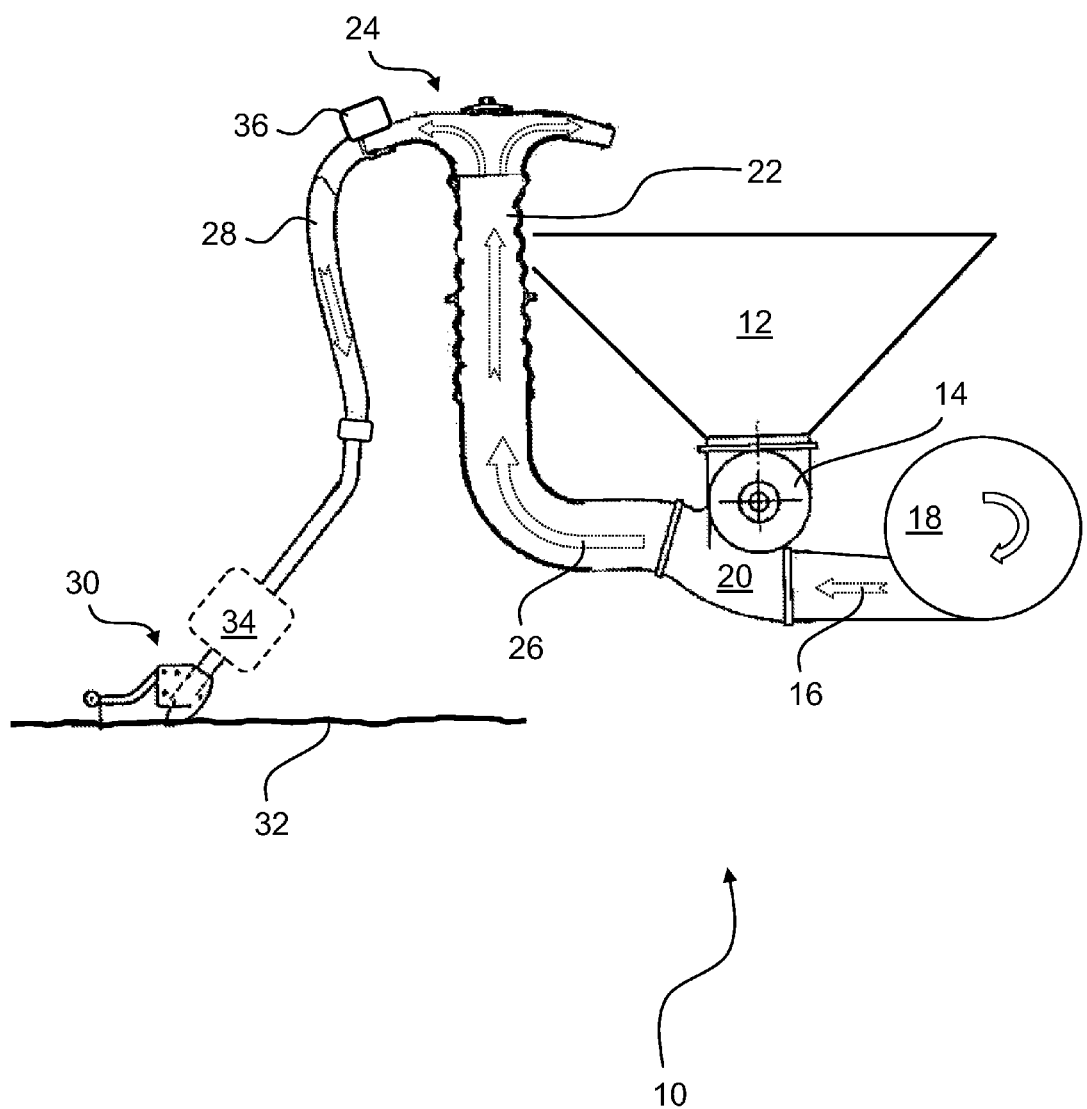
FIG. 1 is a schematic illustration of a pneumatically operating sowing machine with volumetrically metered seeds, which are guided via a central distributor to individual seed tubes with seed drill coulters arranged at the outlets.

The same or equivalent elements of the invention are designated by identical reference characters. Furthermore and for the sake of clarity, only the reference characters relevant for describing the respective figure are provided. It should be understood that the detailed description and specific examples of the device according to the invention, while indicating preferred embodiments, are intended for purposes of illustration only and are not intended to limit the scope of the invention.

The schematic illustration of FIG. 1 shows a pneumatically operating sowing machine 10 for sowing volumetrically metered seeds, which are guided via a central distributor to individual seed tubes with seed drill coulters arranged thereat on the side of the outlets. The exemplarily and schematically represented sowing machine 10 has a funnel-shaped storage hopper 12 for granular material, in particular for seeds, at the underside of which storage hopper 12 is a metering device 14, which meters the granular material or the seeds into an air stream 16, which is generated by an air blower 18 and conveyed into an air duct 20, which leads to a vertically arranged riser pipe 22. A central distributor 24 is arranged at a top side of the riser pipe 22—which can be, for instance, a so-called corrugated pipe or the like—which central distributor 24 distributes the grain-bearing air stream 26 approximately evenly to a multitude of seed tubes 28. The individual seed tubes 28, only one of which is shown for the sake of clarity, each lead to seed drill coulters 30 with which the seeds are placed in the soil 32. The metered feeding of the seeds or granular material released from the storage hopper 12 into the air stream 16 can be optionally carried out according to the Venturi principle or also by support of the seeds that are located, under pressure, in the closed pressure tank 12.

As can be discerned from FIG. 1, a metering unit 34 is located in-line with the seed tube 28, typically in the immediate vicinity to the seed drill coulter 30, which metering unit 34 provides for supplying the seed drill coulter 30 with granular material or with seeds, which are released at approximately equal grain spacing and at largely the same respective conveying speeds into the soil 32. As in existing sowing machines, a multitude of such seed drill coulters 30 is provided (for example twenty-four, thirty-two, or more) in parallel alignment, which are each connected to separate seed tubes 28 which supply a corresponding number of metering units 34, which are each constructed in the same manner and according to the invention, such that each individual seed tube 28 is provided with such a metering unit 34.

FIG. 1 furthermore shows an indicated sensor unit 36, which is arranged in the area of the central distributor 24 and which is, in particular, formed by a respective impact sensor or the like for each seed tube 28, which impact sensor is impacted by the respective part of the air volume flow 26 with the seeds being conveyed therein, with largely all of the grains that are being carried in the respective partial flow making contact. Particularly suited as impact sensors of the sensor units 36 are such as operate with piezoelectric sensor surfaces, which are sufficiently sensitive to reliably react to each impact of a seed and to distinguish it from contacts with lighter particles, such as straw or other contaminants in the seeds, so that very accurate sensor signals can be generated therewith.

For the precise regulation of the metering unit 34 and of the amount of seeds being transported to the seed drill coulter 30 by it as well as for the compliance with the desired grain spacing when sowing the seeds, it is important that the sensor units 36 are arranged respectively upstream in the seed tubes 28 and that the metering units 34 are arranged respectively downstream of these sensor units 36. In this manner it is possible to realize a regulation according to FIG. 2.

Furthermore, another sensor which detects the grain spacing can optionally be arranged downstream of the metering unit 34, between the metering unit 34 and the seed drill coulter 30.

The metering units 34 arranged in-line with the seed tube 28 can in particular have a structure and an operating mode according to DE 10 2013 215 183 B3 (cf. FIG. 2 in that document), the disclosure of which is incorporated by reference. The metering units 34 may each include, for example, a conveyor disk or fan disk 42 driven by an electric motor 48.

Figure 2:
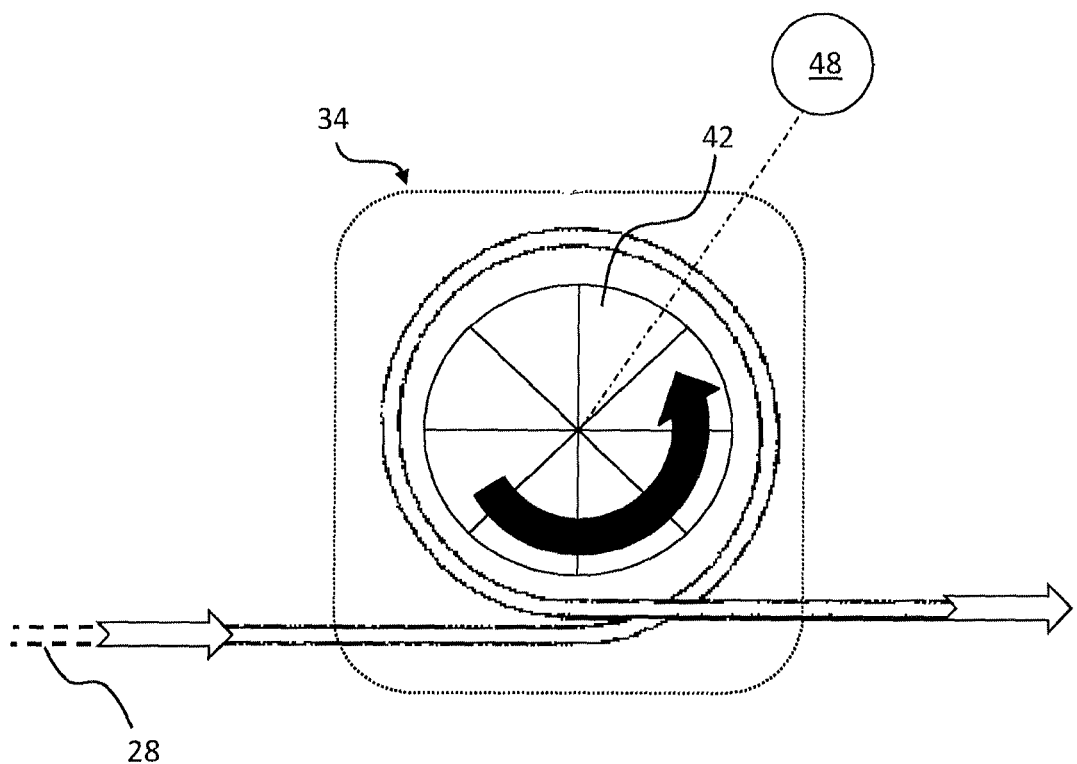
FIG. 2 is a schematic illustration of a metering unit located in-line with each seed tube.
Figure 3:
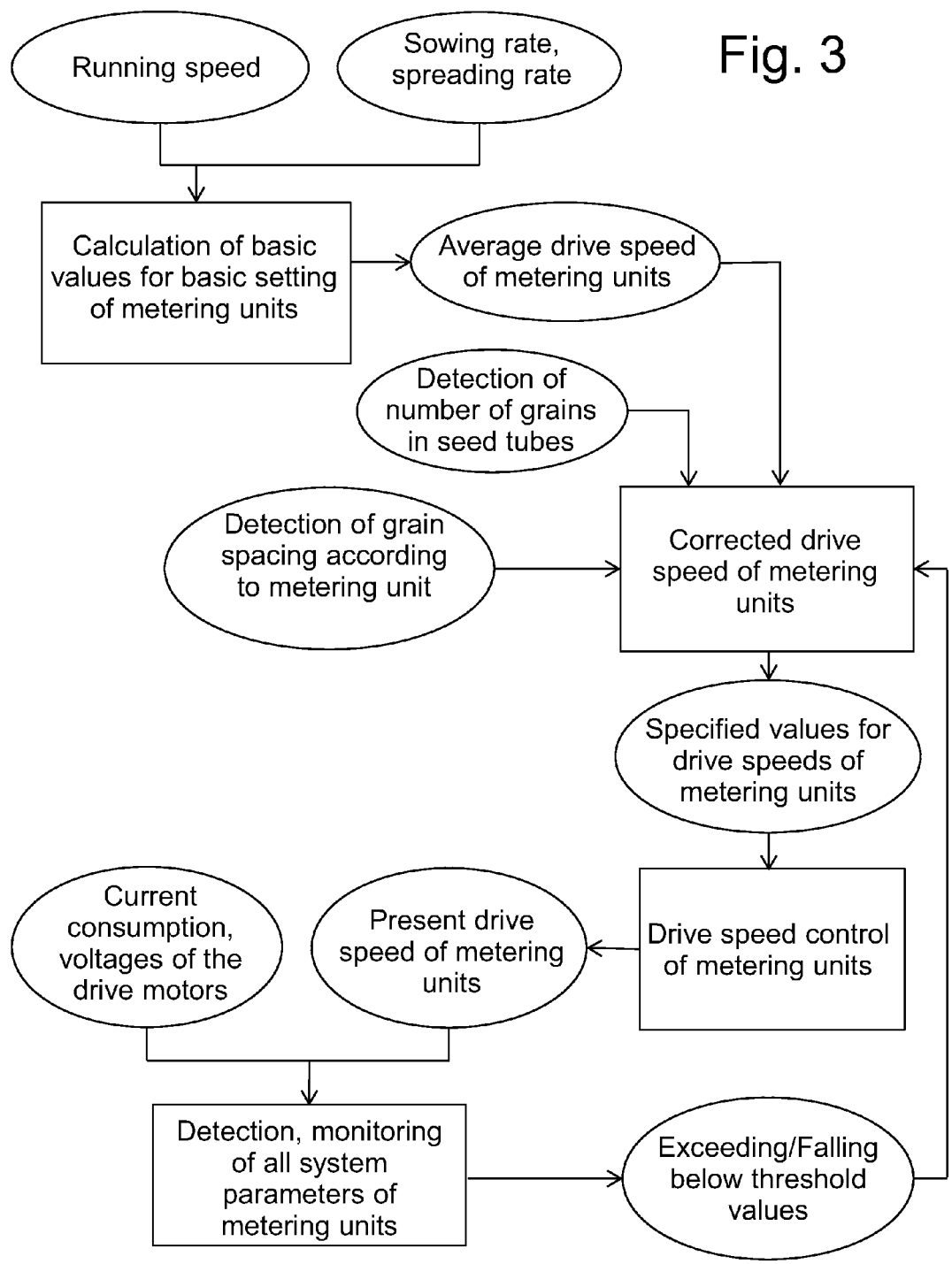
FIG. 3 is a schematic block diagram of a more complex context of regulation for regulating the metering units that are part of the sowing machine according to FIG. 1.

The schematic block diagram of FIG. 3 illustrates the structure of a regulating circuit for linking the sensor signals in the nature of current signals, which are detectable by sensors associated with the electric drive motors 48 of the metering unit 34, and the sensor signals of the sensor units 36, which are additionally linked with further signals, in order to regulate the metering units 34 in the desired manner. The regulation discernible in FIG. 2 of the drive speeds of the electric drive motors 48 of the metering units 34 is carried out for each of the individual units of each seeding row of a sowing machine 10, which has a multitude of seed rows.

From FIG. 2 it is discernible that the basic values for a basic setting of the metering units 34 are calculated first, based on the measured running speed of the sowing machine 10 and on a desired sowing rate or spreading rate. Values for the average drive speeds of the individual metering units 34 are calculated from this. In addition, the quantity of grains being conveyed in the seed tubes 28 to the metering units 34 are detected by means of the sensor units 36. Further grain sensors, which can be arranged between the metering units 34 and the seed drill coulters 30, moreover provide for detecting the grain spacing when the grains are released from the metering units 34 and before they are placed in the ground 32. As the case may be, a corrected drive speed for the metering units or a target value for the drive speed is calculated from these three last-mentioned values. This specified value is provided to a control unit for the drive speed control of the metering units, which results in a respectively present control value for the drive speed of each individual metering unit 34.

Furthermore, the operating parameters of the drive motors of the metering units are measured, namely their present voltages and their current consumption, as these values allow drawing a conclusion as to the required torque and thus as to the respective degree of filling of the metering unit. These control and measurement values are detected and can be processed and/or displayed and also stored. That is, a detection and/or a monitoring is carried out for the most important or for all system parameters that are relevant for the control and the operation of the metering units. As soon as fixed or variable and, as the case may be, dynamically specifiable threshold values for drive parameters or drive speeds of the metering units are exceeded or undershot, a regulating intervention can be carried out, which is reflected in a corrected drive speed of the metering units.

All these mentioned steps are typically conducted cyclically, which results in a precise regulation of the sowing units.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The invention claimed is:

1. A distribution device for distributing granular material, comprising:
    an air conveyor unit for generating an air volume flow;
    at least one metering device arranged downstream of the air conveyor unit for controllable allocation of granular material into the air volume flow;
    at least one conveyor line arranged downstream of the metering device,
    the conveyor line comprising:
        at least one seed drill coulter or sowing device positioned near an end of the conveyor line and positioned near ground level for distribution of granular material onto or into the soil;
        at least one sensor unit for detecting largely all grains in the granular material in the air volume flow passing the sensor unit;
        a metering unit arranged downstream of the sensor unit, the metering unit comprising a conveyor disk or a fan disk having an electromotively regulatable rotational speed and wherein a rotation of the conveyor disk or fan disk circulates at least a portion of the granular material; and
        wherein an electronic regulating device processes an electric current consumption signal of an electric drive motor driving the conveyor disk or fan disk and derives a changing torque of the electric drive motor; and wherein the electronic regulating device further processes an electric sensor signal of the at least one sensor unit and generates a control signal communicated to the electric drive motor to increase or decrease a speed of the electric drive motor based on the derived torque and sensor signal.

2. The distribution device as recited in claim 1, wherein the at least one sensor unit comprises an impact sensor positioned such that it is impacted by largely all of the grains conveyed within the air volume flow passing the sensor unit.

3. The distribution device as recited in claim 2, wherein the electronic regulating device links the signal of the at least one sensor unit and the electric current consumption signal of the electric drive motor of the metering unit and generates a variable speed control signal to vary the flow rate of the metering unit based on a measured grain quantity in the conveyor line upstream of the metering unit.

4. A sowing or spreading machine for distributing granular material within a plurality of rows or seed rows located next to each other, comprising:
    a plurality of distribution devices according to claim 1, wherein each distribution device comprises:
        a seed drill coulter or sowing device for placing grains of the granular material into the soil at a definable placement depth, wherein the seed drill coulter or sowing device is supplied with grains from at least one grain storage hopper via a feed tube not associated with another distribution device, and wherein the feed tube comprises a sensor unit for detecting grains located in an air volume flow passing the sensor unit, and wherein each sowing device or seed drill coulter comprises a metering unit for granular material;
    and wherein each sensor unit and each metering unit of each of the plurality of distribution devices is in electrical communication with a central regulating device which processes a quantity of grains detected in each of the feed tubes of the plurality of distribution devices and processes motor torques derived from electrical currents measured in each of the metering units of the plurality of distribution devices, and which regulates the grain spacing for each metering unit by varying the speeds of the drive motors of each of the plurality of distribution devices to achieve desired target values for the grain spacing, to achieve target values of a longitudinal distribution of grains, and combinations thereof for at least one of the metering units of the plurality of distribution devices.

5. A distribution device for distributing grains of a granular material, the distribution device having an air conveyor unit for generating a stream of air, at least one inlet metering device arranged downstream of the air conveyor unit for the controlled introduction of the grains into the stream of air, at least one conveyor line, which is arranged downstream of the inlet metering device and which is provided at a downstream end with at least one coulter or sowing device, a grain quantity sensor for detecting the quantity of grains carried in the stream of air and passing the grain quantity sensor, the grain quantity sensor generating a grain quantity signal corresponding to the quantity of grains passing the grain quantity sensor, and a grain spacing meter arranged downstream of the grain quantity sensor and having a metering element rotatably driven by an electric drive motor at a regulatable rotational speed for imparting circular movement to the grains passing through the grain spacing meter, wherein a controller processes the grain quantity sensor signal and a drive motor sensor signal generated by a drive motor sensor indicating the electric current consumption of the electric drive motor and generates a control signal for the electric drive motor of the grain spacing meter to increase or reduce the rotational speed of the metering element.

6. The distribution device as in claim 5 wherein the metering element comprises a conveyor disk or fan disk.

7. The distribution device as in claim 5 wherein the grain quantity sensor comprises an impact sensor.

8. The distribution device as in claim 5 in which the controller derives a changing torque of the electric drive motor.

9. The distribution device as in claim 5 further comprising a grain spacing sensor located between the grain spacing meter and the coulter or opener which generates a grain spacing signal indicative of the spacing between grains leaving the grain spacing meter and wherein said controller processes said grain spacing signal and varies the control signal generated to vary the rotational speed of the drive motor so that the grain spacing corresponding to the grain spacing signal approaches a target value for the grain spacing.

10. A distribution device for distributing grains of a granular material comprising:

an air conveyor unit for generating a stream of air, at least one inlet metering device arranged downstream of the air conveyor unit for the controlled introduction of grains of the granular material into the stream of air flowing through a conveyor line connected to and extending downstream of the inlet metering device, a plurality of feed tubes connected to the conveyor line and through which the stream of air and grains entrained therein are distributed, wherein each conveyor line includes at a downstream end at least one coulter or sowing device, a grain quantity sensor connected to each feed tube for detecting a quantity of grains carried in the stream of air in the respective feed tube and passing the respective grain quantity sensor, wherein each grain quantity sensor generates a grain quantity signal corresponding to a quantity of grains detected passing the grain quantity sensor, and a grain spacing meter arranged on each feed tube downstream of the grain quantity sensor, wherein each grain spacing meter includes a metering element rotatably driven by an electric drive motor at a regulatable rotational speed for imparting circular movement to the grains passing therethrough, wherein a controller processes grain quantity sensor signals and drive motor sensor signals generated by a drive motor sensor indicating the electric current consumption of the electric drive motor of each grain spacing meter, and generates a control signal for a respective electric drive motor of a respective grain spacing meter to increase or reduce the rotational speed of the respective metering element.

11. A distribution device for distributing granular material, comprising:

an air conveyor unit for generating an air volume flow, at least one metering device downstream of the air conveyor unit for the controllable allocation of granular material into the air volume flow, at least one conveyor line downstream of the metering device comprising at least one seed drill coulter or sowing device positioned near ground level, at least one sensor unit for detecting largely all grains from among the granular material carried in the air volume flow and passing the sensor unit, and a metering unit arranged downstream of the sensor unit, wherein the metering unit is equipped with a conveyor disk or fan disk having an electrically regulatable rotational speed to control circulation of the at least a portion of the granular material and wherein an electronic regulating device processes at least an electric current consumption of an electric drive motor driving the conveyor disk or fan disk rotating within the metering unit and an electric sensor signal of the at least one sensor unit and generates a control signal to the electric drive motor of the metering unit commanding an increase or reduction of the speed of the electric drive motor rotating the conveyor disk or fan disk based on the electric current consumption, the electric sensor signal, or combinations thereof.

12. The distribution device as recited in claim 11, wherein the at least one sensor unit comprises an impact sensor positioned such that it is impacted by largely all of the grains carried in the air volume flow passing the sensor unit.

13. The distribution device as recited in claim 12, wherein the electronic regulating device links signals of the at least one impact sensor and power consumption signals of the electric drive motor of the metering unit and generates a variable speed control signal for varying the flow rate of the metering unit based on the power consumption and impact sensor signals and a measured grain quantity in the conveyor line upstream of the metering device.

* * * * *